N. ARMSTRONG & E. H. GROVES.
PITCHFORK ATTACHMENT.
APPLICATION FILED APR. 3, 1918.
1,273,718.
Patented July 23, 1918.
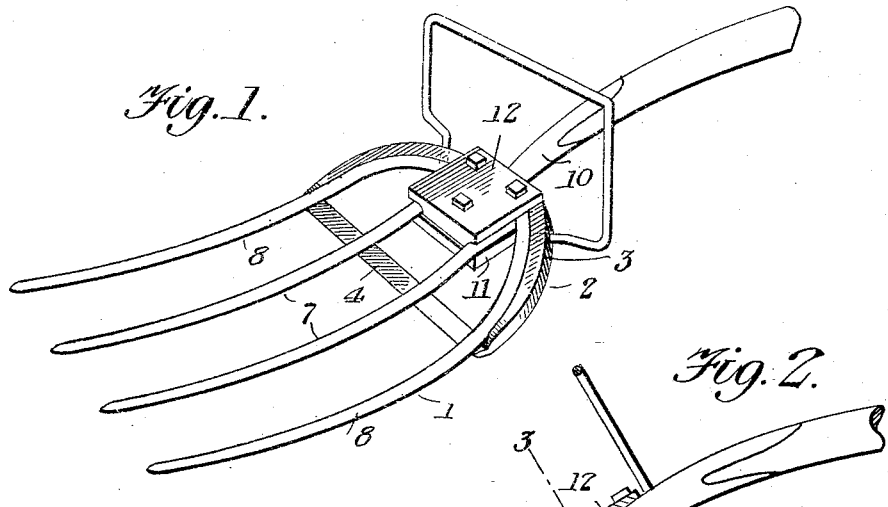
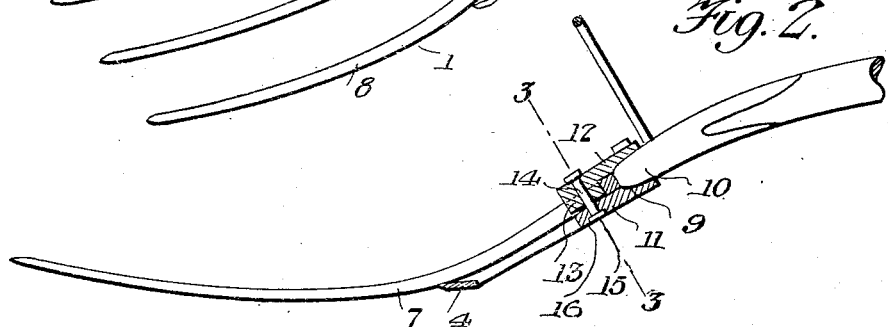
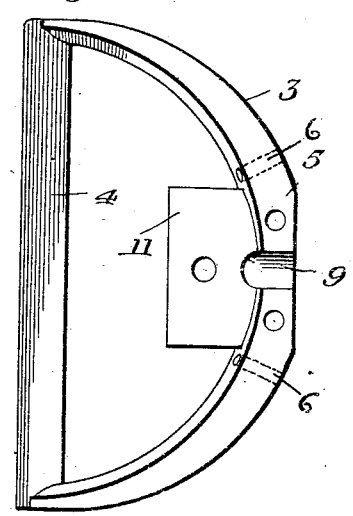
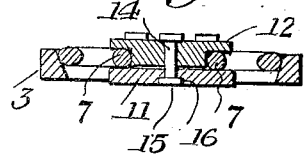
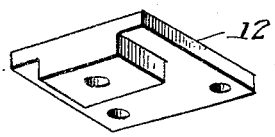
Witness
Le Roy Kauffman
Inventors
Neal Armstrong
Elmer H. Groves
By Victor J. Evans
Attorney

UNITED STATES PATENT OFFICE.

NEAL ARMSTRONG AND ELMER H. GROVES, OF ADENA, COLORADO.

PITCHFORK ATTACHMENT.

1,273,718.   Specification of Letters Patent.   Patented July 23, 1918.

Application filed April 3, 1918. Serial No. 226,459.

*To all whom it may concern:*

Be it known that we, NEAL ARMSTRONG and ELMER H. GROVES, citizens of the United States, residing at Adena, in the county of Morgan and State of Colorado, have invented new and useful Improvements in Pitchfork Attachments, of which the following is a specification.

This invention relates to a cutting attachment for pitchforks.

The object of the invention is to provide a cutting blade which may be easily and quickly secured on the tines of any ordinary construction of pitchforks, to provide a cutting implement for the latter.

A further object of the invention is to produce a device of this character primarily, but not necessarily designed for harvesting beans, which shall be of a simple construction, cheap to manufacture, easily applied, effectively secured, and certain in operation.

A simple and satisfactory embodiment of the improvement is illustrated by the accompanying drawings, in which, Figure 1 is a perspective view illustrating the application of the improvement.

Fig. 2 is an approximately central longitudinal sectional view through the same.

Fig. 3 is a sectional view approximately on the line 3—3 of Fig. 2.

Fig. 4 is a plan view of the improvement, the lug plate being removed.

Fig. 5 is a perspective view of the lug plate looking toward the inner face thereof.

In the drawings the numeral 1 designates a pitchfork of the ordinary construction, and 2 the improvement which is arranged on the tines thereof.

The improvement includes an arched frame 3 that is provided, at its outer portion with an angularly disposed cutting blade 4, the said blade being connected with or formed on the ends of the said members or arms of the frame. The connecting member for the arms is, for distinction indicated by the numeral 5 and is provided with spaced openings 6 through which the inner pair of tines 7 of the pitchfork are passed, the said tines projecting beyond the blade 4. The outer curved tines 8 of the fork 1 frictionally contact with the outer curved surfaces of the frame 3, and are, of course, extended beyond the blade 4 of the device. The connecting member 5 for the arched arms of the frame 3 is centrally formed with a depression 9 in which is received the socket 10 of the pitchfork. To reinforce the frame, at the socket thereof, the connecting member 5 is integrally formed with an inwardly extending plate 11. The socket is closed by what we will term a lug plate 12, the said plate being provided, on its inner surface with a lug 13 that contacts directly with the plate 11 and which may provide the inner transverse wall for the socket 10. The plate 12 is provided with a plurality of openings which aline with similar openings in the plate 11 and in the connecting member 5 of the frame 3, and passing through these openings are bolts 14 which engage with the nuts 15 that are received in suitable depressions or pockets 16 on the plate 11 and on the connecting member 5 for the arms of the frame, the said pockets, of course, communicate with the openings through which the bolts pass.

By adjusting the bolts the lug plate may be brought to tight engagement with the socket 10 so that the improvement, in addition to the contacting engagement of the tines with the outer edges of the frame and with the blade 4, will be thus more effectively sustained on the tines of the fork, and it is believed the simplicity and advantages of the device will be apparent without further description.

What we claim is:

1. In combination with a pitchfork, of a cutting implement arranged on the tines thereof, said implement including an arched frame and an angle cutting blade connecting the arms of the frame, said frame having openings through which the central tines of the fork pass and the outer tines designed to frictionally contact with the outer edges of the frame.

2. In combination with a pitchfork, of a cutting attachment therefor, comprising an arched frame having an angularly disposed cutting blade connecting the ends of the said frame, said frame having openings through which the central tines pass whereby the latter will engage with the cutting blade and extend therebeyond, the outer tines designed to frictionally engage with the outer edges of the sides of the frame, said frame having a depression receiving the socket of the pitchfork, a lug plate closing the socket, and connecting means between the lug plate and the frame.

In testimony whereof we affix our signatures.

NEAL ARMSTRONG.
ELMER H. GROVES.

Copies of this patent may be obtained for five cents each, by addressing the "Commissioner of Patents, Washington, D. C."